(12) United States Patent
Salter et al.

(10) Patent No.: US 11,951,937 B2
(45) Date of Patent: Apr. 9, 2024

(54) VEHICLE POWER MANAGEMENT

(71) Applicant: Ford Global Technologies, LLC, Dearborn, MI (US)

(72) Inventors: Stuart C. Salter, White Lake, MI (US); Zeljko Deljevic, Plymouth, MI (US); John Robert Van Wiemeersch, Novi, MI (US); Sam Harris, Billericay (GB); Tarik Safir, Chesterfield (GB); Donald Paul Bilger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 17/199,887

(22) Filed: Mar. 12, 2021

(65) Prior Publication Data
US 2022/0289136 A1 Sep. 15, 2022

(51) Int. Cl.
*B60R 25/02* (2013.01)
*B60R 25/102* (2013.01)
*B60R 25/30* (2013.01)
*B60R 25/31* (2013.01)
*B60R 25/34* (2013.01)
*B60R 16/033* (2006.01)
(Continued)

(52) U.S. Cl.
CPC ............ *B60R 25/02* (2013.01); *B60R 25/102* (2013.01); *B60R 25/305* (2013.01); *B60R 25/31* (2013.01); *B60R 25/34* (2013.01)

(58) Field of Classification Search
None
See application file for complete search history.

(56) References Cited

U.S. PATENT DOCUMENTS

| 5,563,576 | A | 10/1996 | Drori et al. |
| 5,581,464 | A | 12/1996 | Woll et al. |

(Continued)

FOREIGN PATENT DOCUMENTS

| DE | 102015118874 A1 | 5/2017 |
| WO | 2009094367 A1 | 7/2009 |

(Continued)

OTHER PUBLICATIONS

Non-Final Office Action dated Aug. 23, 2022 re U.S. Appl. No. 17/199,805, filed Mar. 12, 2021.

(Continued)

*Primary Examiner* — Aniss Chad
*Assistant Examiner* — Madison R Hughes
(74) *Attorney, Agent, or Firm* — Frank Lollo; Bejin Bieneman PLC

(57) ABSTRACT

Upon identifying an authorized user approaching a vehicle, vehicle locks are controlled to permit the authorized user to access an authorized area based on a user authorization. Permitted vehicle features within the authorized area for the authorized user are identified based on the user authorization. Upon receiving a user input selecting one permitted vehicle feature, the selected permitted vehicle feature is actuated based on determining that a state of charge of a battery is above a charge threshold. Upon determining that the state of charge of the battery decreases below the charge threshold, actuation of the selected permitted vehicle feature is stopped. Then an engine is controlled to charge the battery based on the user authorization.

20 Claims, 6 Drawing Sheets

(51) Int. Cl.
*B60R 25/20* (2013.01)
*B60R 25/40* (2013.01)

(56) References Cited

U.S. PATENT DOCUMENTS

| | | | |
|---|---|---|---|
| 7,417,585 | B2 | 8/2008 | Yamagami et al. |
| 8,768,549 | B2 | 7/2014 | Erko et al. |
| 9,266,443 | B2 | 2/2016 | Payne et al. |
| 9,344,683 | B1 | 5/2016 | Nemat-Nasser et al. |
| 9,394,059 | B2 | 7/2016 | Cox et al. |
| 9,412,268 | B2 | 8/2016 | Saptharishi et al. |
| 9,438,868 | B2 | 9/2016 | Boettiger |
| 9,784,229 | B2 | 10/2017 | Holub et al. |
| 9,880,278 | B2 | 1/2018 | van Uffelen et al. |
| 10,600,257 | B2 | 3/2020 | Jiang et al. |
| 10,607,458 | B1 | 3/2020 | Sampson et al. |
| 10,712,742 | B2 | 7/2020 | Valois |
| 10,850,709 | B1 | 12/2020 | Nagata et al. |
| 10,899,317 | B1 | 1/2021 | Moeller et al. |
| 11,099,264 | B2 | 8/2021 | Bhatia et al. |
| 11,104,270 | B1 | 8/2021 | Timms |
| 11,206,465 | B1 | 12/2021 | Krotosky |
| 11,427,143 | B1 | 8/2022 | Linsmeier |
| 11,823,564 | B1 | 11/2023 | Wittevrongel et al. |
| 2004/0257045 | A1 | 12/2004 | Sada et al. |
| 2005/0073433 | A1 | 4/2005 | Gunderson et al. |
| 2005/0193212 | A1 | 9/2005 | Yuhara |
| 2005/0200606 | A1 | 9/2005 | Willemin et al. |
| 2007/0067079 | A1 | 3/2007 | Kosugi |
| 2008/0097664 | A1 | 4/2008 | Aoyama et al. |
| 2009/0064696 | A1* | 3/2009 | Perkins .............. B60H 1/00428 62/244 |
| 2010/0265344 | A1 | 10/2010 | Velarde et al. |
| 2011/0216200 | A1 | 9/2011 | Chung et al. |
| 2012/0044046 | A1 | 2/2012 | Al-Jafar |
| 2012/0044327 | A1 | 2/2012 | Horita et al. |
| 2012/0188054 | A1 | 7/2012 | Bongard |
| 2013/0117078 | A1 | 5/2013 | Weik, III et al. |
| 2014/0067152 | A1 | 3/2014 | Swanson et al. |
| 2015/0042815 | A1 | 2/2015 | Park et al. |
| 2016/0104325 | A1 | 4/2016 | Lu |
| 2016/0323508 | A1 | 11/2016 | Ayalasomayajula et al. |
| 2016/0331192 | A1 | 11/2016 | Rubenson et al. |
| 2016/0332535 | A1 | 11/2016 | Bradley et al. |
| 2016/0356594 | A1 | 12/2016 | Sorenson |
| 2017/0075888 | A1 | 3/2017 | Ekin |
| 2017/0160392 | A1 | 6/2017 | Brisimitzakis et al. |
| 2017/0337435 | A1 | 11/2017 | Uliyar et al. |
| 2018/0053313 | A1 | 2/2018 | Smith |
| 2018/0147986 | A1 | 5/2018 | Chi et al. |
| 2018/0324393 | A1 | 11/2018 | Ryan et al. |
| 2018/0332218 | A1 | 11/2018 | Yoshimura |
| 2019/0102963 | A1 | 4/2019 | Owens et al. |
| 2019/0108010 | A1* | 4/2019 | Tillman .................. H04L 67/12 |
| 2019/0122460 | A1 | 4/2019 | Reyes et al. |
| 2019/0141419 | A1 | 5/2019 | Xu et al. |
| 2019/0225150 | A1 | 7/2019 | Nohl et al. |
| 2019/0228647 | A1 | 7/2019 | Conde et al. |
| 2019/0249635 | A1* | 8/2019 | Khafagy ............... F02N 11/084 |
| 2019/0391250 | A1 | 12/2019 | Cohen et al. |
| 2020/0025964 | A1 | 1/2020 | Kubo |
| 2020/0031312 | A1 | 1/2020 | Schat et al. |
| 2020/0033849 | A1 | 1/2020 | Yiu et al. |
| 2020/0114886 | A1 | 4/2020 | Kim |
| 2020/0209377 | A1 | 7/2020 | Ogura et al. |
| 2020/0209869 | A1 | 7/2020 | Totoura et al. |
| 2020/0247423 | A1 | 8/2020 | Almahmoud et al. |
| 2020/0282921 | A1 | 9/2020 | Herman |
| 2020/0327757 | A1 | 10/2020 | Kelley et al. |
| 2020/0339101 | A1 | 10/2020 | Gantt, Jr. et al. |
| 2020/0408876 | A1 | 12/2020 | Weber et al. |
| 2021/0001810 | A1* | 1/2021 | Rivard ................. G06V 40/172 |
| 2021/0026019 | A1 | 1/2021 | Gahagan et al. |
| 2021/0086761 | A1 | 3/2021 | El Assaad et al. |
| 2021/0092321 | A1 | 3/2021 | Li et al. |
| 2021/0178936 | A1* | 6/2021 | Yetukuri ............... H04L 67/306 |
| 2021/0223359 | A1 | 7/2021 | Harrison |
| 2021/0245662 | A1 | 8/2021 | Blank et al. |
| 2021/0309183 | A1 | 10/2021 | Bielby et al. |
| 2021/0309257 | A1 | 10/2021 | Roberts et al. |
| 2021/0349204 | A1 | 11/2021 | Brodsky et al. |
| 2022/0123570 | A1 | 4/2022 | Fuchs et al. |
| 2022/0126832 | A1 | 4/2022 | Ewert |
| 2022/0250583 | A1* | 8/2022 | Garg ..................... B60R 25/102 |
| 2023/0056115 | A1 | 2/2023 | Arnold et al. |

FOREIGN PATENT DOCUMENTS

| | | |
|---|---|---|
| WO | 2019013948 A1 | 1/2019 |
| WO | 2021003440 A1 | 1/2021 |

OTHER PUBLICATIONS

Non-Final Office Action dated Mar. 28, 2023 re U.S. Appl. No. 17/099,869, filed Nov. 17, 2020.
Non-Final Office Action dated Jun. 22, 2023 re U.S. Appl. No. 17/199,954, filed Mar. 12, 2021.
Ex Parte Quayle Action dated Jun. 23, 2023 re U.S. Appl. No. 17/199,768, filed Mar. 12, 2021.
Notice of Allowance dated Jul. 13, 2023 re U.S. Appl. No. 17/099,869, filed Nov. 17, 2020.
Non-Final Office Action dated Jul. 19, 2023 re U.S. Appl. No. 17/199,688, filed Mar. 12, 2021.
Final Office Action dated Dec. 6, 2022 re U.S. Appl. No. 17/199,805, filed Mar. 12, 2021.
Notice of Allowance dated Sep. 28, 2023 re U.S. Appl. No. 17/199,954, filed Mar. 12, 2021.
Notice of Allowance dated Dec. 28, 2023 re U.S. Appl. No. 17/199,688, filed Mar. 12, 2021.

\* cited by examiner

VEHICLE POWER MANAGEMENT

BACKGROUND

Vehicles can use a battery and an internal combustion engine to power vehicle components, including, e.g., a powertrain, a steering rack, etc., during vehicle operation. For example, sensors that collect data while operating, including radar, LIDAR, vision systems, infrared systems, and ultrasonic transducers, consume energy from the battery. When the vehicle is deactivated, one or more components can remain activated, drawing power from the battery that may then be unavailable to reactivate the vehicle.

DETAILED DESCRIPTION

Figure 1:
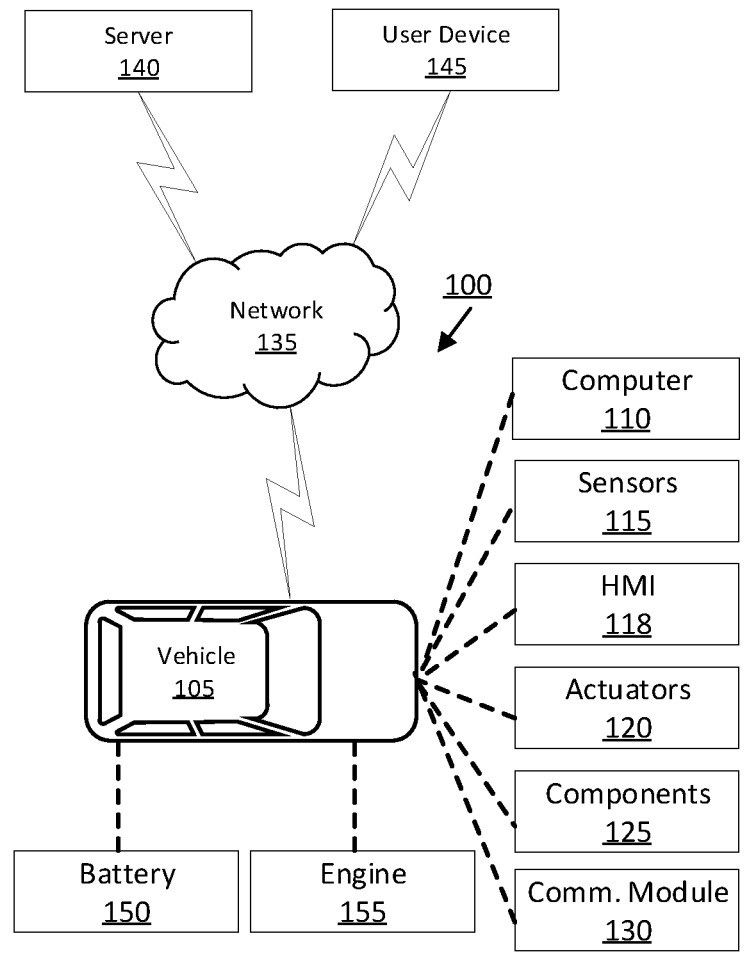
FIG. 1 is a block diagram illustrating an example vehicle control system for a vehicle.

While in a minimal power state, various vehicle features may be selected by a user in a vehicle whereby vehicle components may draw power from a battery to operate the selected vehicle features. To transition the vehicle to the on state, one or more vehicle components may draw power from the battery to start a propulsion, e.g., an engine, and activate other vehicle components for use during vehicle operation. When the vehicle components reduce a state of charge of the battery while the vehicle is in the minimal power state, the battery may not have enough power to transition the vehicle to the on state. Thus, the state of charge of the battery can be monitored to ensure that the charge in the battery remains above a charge threshold, e.g., to be able to transition the vehicle to the one state.

Advantageously, a vehicle computer can provide an energy-efficient way to monitor the state of charge of the battery while the vehicle is in the minimal power state. While in a minimal power state, the vehicle computer can detect and monitor users in and around the vehicle based on data from a first sensor. The vehicle computer can selectively activate a second sensor, which is more energy-intensive than the first sensor, to identify users attempting to access the vehicle. Selectively activating the second sensor in the minimal power state can prevent or reduce power consumption by the second sensor, thereby preventing or reducing power consumed from the battery.

Additionally, the vehicle computer can actuate a selected vehicle feature based on the user having permission to operate the selected vehicle feature and the state of charge of the battery being above a charge threshold. Upon determining that the state of charge has decreased below the charge threshold, the vehicle computer can stop or prevent actuation of the selected vehicle feature to prevent further power consumption by the selected vehicle feature. The vehicle computer then can control an engine to charge the battery, i.e., transition the vehicle to the on state, based on the user having permission to charge the battery. Limiting power consumption when the vehicle is in the minimal power state is advantageous because the vehicle typically relies on a finite supply of stored power.

A system includes a first sensor and a second sensor having a higher power draw than the first sensor. A computer is communicatively coupled to the first sensor and the second sensor. The computer includes a processor and a memory, the memory storing instructions executable by the processor to, upon identifying an authorized user approaching a vehicle, control vehicle locks to permit the authorized user to access an authorized area based on a user authorization. The instructions further include instructions to identify permitted vehicle features within the authorized area for the authorized user based on the user authorization. The instructions further include instructions to, upon receiving a user input selecting one permitted vehicle feature, actuate the selected permitted vehicle feature based on determining that a state of charge of a battery is above a charge threshold. The instructions further include instructions to, upon determining that the state of charge of the battery decreases below the charge threshold, stop actuation of the selected permitted vehicle feature. The instructions further include instructions to then control an engine to charge the battery based on the user authorization.

The system may include a housing containing the first sensor and the second sensor.

The first sensor and the second sensor may be arranged in the housing so that respective fields of view of the first sensor and second sensor encompass the authorized area.

The first sensor may be a radar, and the second sensor may be a camera.

The first sensor and the second sensor may be within a passenger cabin of the vehicle.

A system includes a computer including a processor and a memory, the memory storing instructions executable by the processor to, upon identifying an authorized user approaching a vehicle, control vehicle locks to permit the authorized user to access an authorized area based on a user authorization. The instructions further include instructions to identify permitted vehicle features within the authorized area for the authorized user based on the user authorization. The instructions further include instructions to, upon receiving a user input selecting one permitted vehicle feature, actuate the selected permitted vehicle feature based on determining that a state of charge of a battery is above a charge threshold. The instructions further include instructions to, upon determining that the state of charge of the battery decreases below the charge threshold, stop actuation of the selected permitted vehicle feature. The instructions further include instructions to then control an engine to charge the battery based on the user authorization.

The instructions can further include instructions to, upon identifying an unauthorized user, control vehicle locks to prevent the unauthorized user from accessing the vehicle.

The instructions can further include instructions to, upon detecting the authorized user in an area outside of the authorized area and within the vehicle, provide a message to a remote computer.

The instructions can further include instructions to, upon receiving a user input selecting an unpermitted vehicle feature, prevent actuation of the selected unpermitted vehicle feature.

The instructions can further include instructions to determine the authorized user is in the authorized area based on data from a first sensor.

The instructions can further include instructions to, upon detecting the authorized user in an area outside of the authorized area and within the vehicle, activate a second sensor, wherein the second sensor has a higher power draw than the first sensor.

The instructions can further include instructions to provide data from the second sensor to a remote computer.

The instructions can further include instructions to, upon detecting a second authorized user within the authorized area, determine whether the authorized user or the second authorized user provides the user input based on data from the first sensor.

The instructions can further include instructions to actuate the engine to charge the battery based on the authorized user having permission to charge the battery.

The instructions can further include instructions to stop the engine based on detecting the state of charge increases above the charge threshold.

The instructions can further include instructions to, upon detecting the state of charge increases above the charge threshold, actuate the selected permitted vehicle feature.

The instructions can further include instructions to prevent actuation of the engine to charge the battery based on the authorized user lacking permission to charge the battery.

The instructions can further include instructions to detect a user approaching the vehicle based on data from a first external sensor.

The instructions can further include instructions to, upon detecting the user approaching the vehicle, activate a second external sensor, wherein the second external sensor has a higher power draw than the first external sensor.

The instructions can further include instructions to identify the user based on data from the second external sensor.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-3B, an example vehicle control system 100 includes a vehicle 105. A vehicle computer 110 in the vehicle 105 receives data from sensors 115, including a first sensor 115a and a second sensor 115b. The vehicle computer 110 is programmed to, upon identifying an authorized user approaching the vehicle 105, control vehicle locks to permit the authorized user to access an authorized area based on a user authorization. The vehicle computer 110 is further programmed to identify permitted vehicle features within the authorized area for the authorized user based on the user authorization. The vehicle computer 110 is further programmed to, upon receiving a user input selecting one permitted vehicle feature, actuate the selected permitted vehicle feature based on determining that a state of charge of a battery is above a charge threshold. The vehicle computer 110 is further programmed to, upon determining that the state of charge of the battery decreases below the charge threshold, stop actuation of the selected permitted vehicle feature. The vehicle computer 110 is further programmed to then control an engine to charge the battery based on the user authorization.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to-infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, etc.

Figure 2:
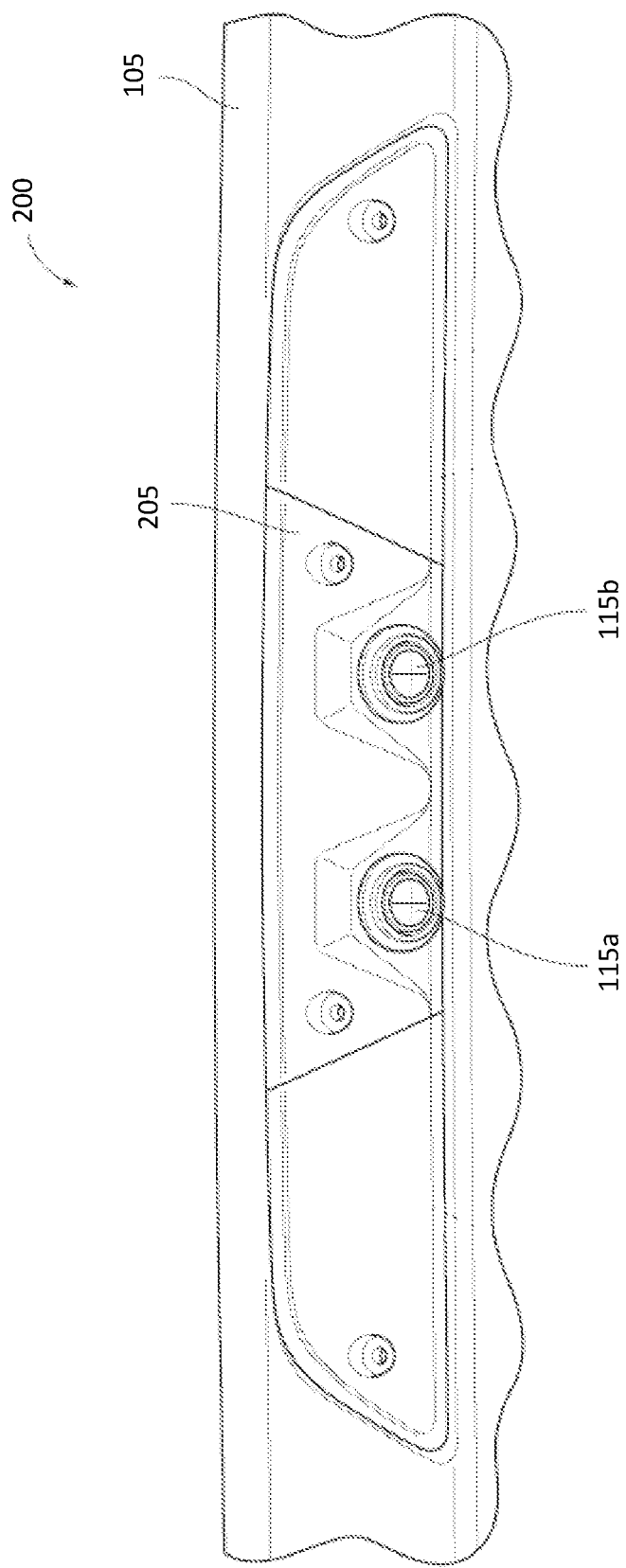
FIG. 2 is a plan view of a sensor assembly including first and second sensors.
Figure 3:
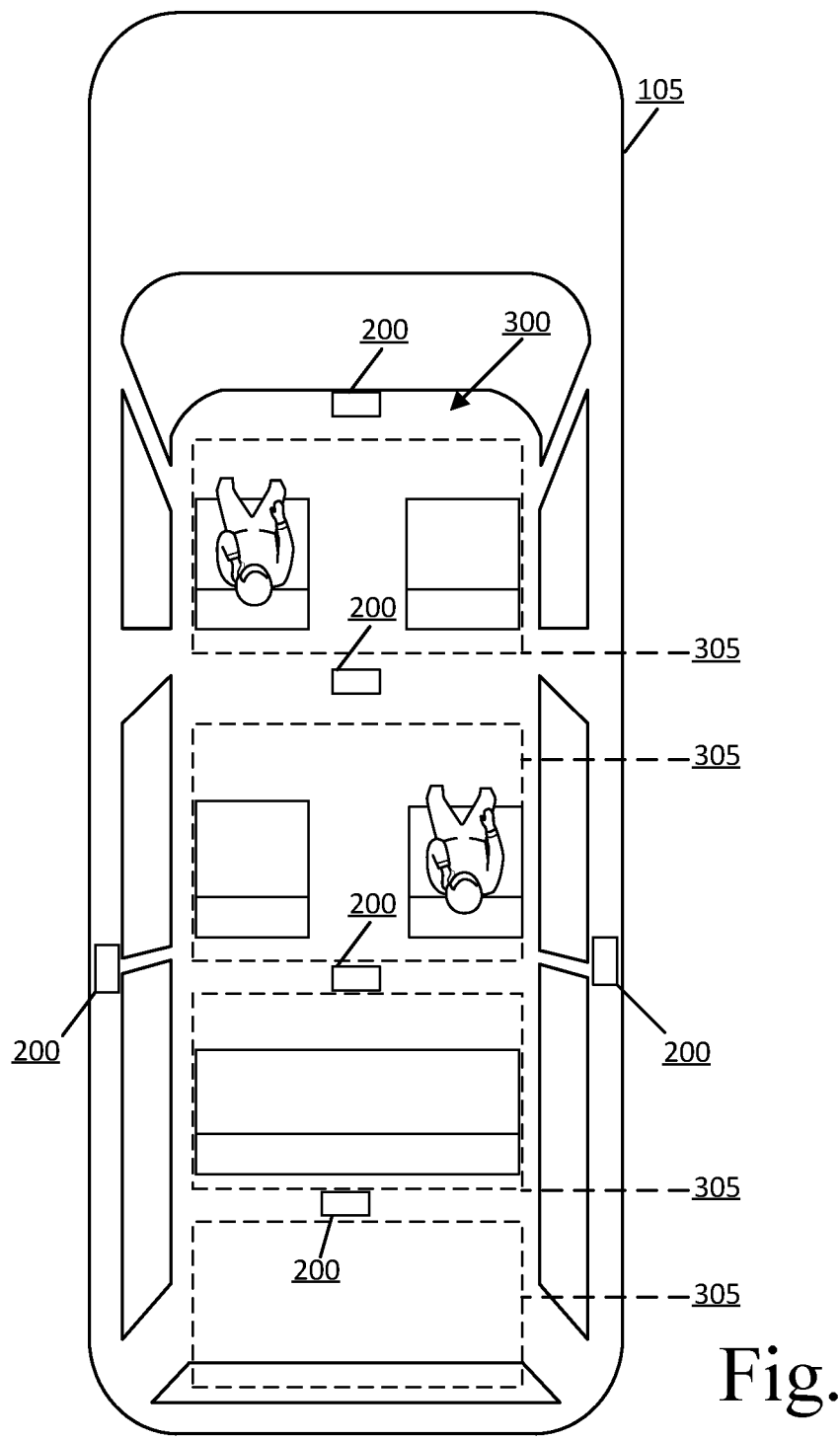
FIG. 3 is a diagram illustrating an exemplary passenger cabin of the vehicle including a plurality of zones.

Turning now to FIG. 2, the vehicle 105 may include a sensor assembly 200. The sensor assembly 200 includes a housing 205, a first sensor 115a, and a second sensor 115b. The housing 205 may be mounted, e.g., via fasteners, welding, adhesive, etc., to the vehicle 105. The housing 205 may be mounted to a rear, front, and/or side of the vehicle 105 exterior. The vehicle 105 may include any suitable number of sensor assemblies 200, e.g., one or more. For example, as illustrated in FIG. 3, the vehicle 105 may include a plurality of sensor assemblies 200 that are positioned to monitor an environment around the vehicle 105, i.e., external sensor assemblies 200, and a plurality sensor assemblies 200 that are positioned to monitor a passenger cabin 300 of the vehicle 105, i.e., internal sensor assemblies 200.

The housing 205 houses the first sensor 115a and the second sensor 115b. The first sensor 115a is a type suitable for detecting objects, e.g., in an environment around the vehicle 105. In particular, the first sensor 115a can be a radar. A radar, as is known, uses radio waves to determine the relative location, angle, and/or velocity of an object by tracking the time required for the radio waves generated by the radar to reflect back to the radar. Alternatively, the first sensor 115a can be an ultrasonic sensor, a UWB transceiver, or any other suitable type of sensor. The first sensor 115a runs at a scanning rate, which is an occurrence interval of generating and transmitting the radio waves, e.g., twice per second, once every two seconds, etc. The power draw, i.e., the rate of power consumption, of the first sensor 115a depends on the scanning rate, i.e., typically is higher for higher scanning rates.

The second sensor 115b has a power draw that is higher than the power draw of the first sensor 115a for any scanning rate of the first sensor 115a. The second sensor 115b is a type suitable for providing data about the environment around the vehicle 105. In particular, the second sensor 115b can be a camera. A camera, as is known, detects electromagnetic radiation in some range of wavelengths. For example, the camera may detect visible light, infrared radiation, ultraviolet light, or some range of wavelengths including visible, infrared, and/or ultraviolet light. Alternatively, the second sensor 115b can be an ultrasonic sensor, a UWB transceiver, or any other suitable type of sensor.

The first sensor 115a and the second sensor 115b can be arranged in the housing so that respective fields of view of the first sensor 115a and the second sensor 115b at least partially overlap. For example, as shown in the Figures, fields of view of the first and second sensors 115a, 115b may be identical. The fields of view of the first and second sensors 115a, 115b encompass an area or, more typically, a three-dimensional space, i.e., a volume, around the vehicle 105. For example, the first and second sensors 115a, 115b can be mounted into a fixed position relative to the housing 205. The first and second sensors 115a, 115b can face in generally a same direction relative to the vehicle 105.

FIG. 3 is a diagram of a top view of an example passenger cabin 300 of an example vehicle 105. The vehicle 105 may include a body (not numbered) defining the passenger cabin 300 to house occupants, if any, of the vehicle. The body includes doors and windows openable to allow ingress and egress from the passenger cabin 300.

The passenger cabin 300 may extend across the vehicle 105, i.e., from one side to the other side of the vehicle 105. The passenger cabin 300 includes a front end (not numbered) and a rear end (not numbered) with the front end being in front of the rear end during forward movement of the vehicle 105. The passenger cabin 300 includes one or more seats (not numbered). The seats may be arranged in any suitable arrangement. For example, the passenger cabin 300 may include one or more front seats disposed at a front of the passenger cabin 300 and one or more back seats disposed behind the front seats. The passenger cabin 300 may also include third-row seats at the rear of the passenger cabin 300. In FIG. 3, the front seats and back seats are shown to be bucket seats and the third-row seats are shown to be bench seats, but the seats may be other types.

The vehicle computer 110 can receive, determine, and/or store location data defining a plurality of zones 305 within the passenger cabin 300. That is, the vehicle computer 110 can subdivide the passenger cabin 300 into the plurality of zones 305. The location data of the zones 305 can be specified in a vehicle coordinate system, e.g., a multi-dimensional Cartesian coordinate system having a predetermined origin point included in the passenger cabin 300 of the vehicle 105. For example, the location data may represent boundaries of the zones 305. In the present context, a zone is an area or, more typically, a three-dimensional space, i.e., a volume, within which a user can sit while within the passenger cabin 300. The vehicle computer 110 can define any suitable number of zones 305 within the passenger cabin 300. The vehicle computer 110 can define each zone 305 by objects and features that occupy, surround, and/or abut the zone 305. For example, the vehicle computer 110 can define a zone 305 such that the zone 305 encompasses one row of seats within the passenger cabin 300. As another example, the vehicle computer 110 can define a zone 305 such that the zone 305 extends between the rear of the passenger cabin 300 and the back seats (or third-row seats). Alternatively, the vehicle computer 110 can receive a user input, e.g., via the HMI 118 or the user device 145, specifying a number and size of zones 305 within the passenger cabin 300. The plurality of zones 305 may be stored, e.g., in a memory of the vehicle computer 110.

The vehicle computer 110 is programmed to manage startup and shutdown of the vehicle 105. That is, the vehicle computer 110 can transition the vehicle 105 between activation states. For example, the vehicle computer 110 can transition the vehicle 105 between activation states based on receiving a request from, e.g., the remote server computer 140, the user device 145, user input to a power button in a passenger cabin 300 of the vehicle 105, etc. In this context, an "activation state" specifies a power state of vehicle components 125 and sensors 115, i.e., whether, and/or an amount that, a component 125 and/or sensor 115 is electrically powered during startup and/or shutdown of the vehicle 105, e.g., unpowered, powered with a specific power supply, etc.

The activation state can be one of an off state, a minimal power state, and an on state. In the on state, all vehicle components 125 and sensors 115 are available to be actuated by the vehicle computer 110 to operate the vehicle 105. In the off state, the vehicle components 125 and sensors 115 are substantially powered off to conserve energy when the vehicle 105 is not in use. In the minimal power state, vehicle components 125 and/or sensors 115 may draw power from a power supply for less than all operation when the vehicle 105 is in the on state. That is, the vehicle components 125 and/or sensors 115 draw power for a specific, limited set of operations, e.g., monitoring the environment around the vehicle 105.

A battery 150 provides power (i.e., electricity) to the vehicle components 125 and the sensors 115 of the vehicle 105. The battery 150 can be, e.g., a lead-acid battery, a lithium-ion battery, a set of battery arrays, etc. One or more power networks can supply power from the battery 150 to the components 125 and sensors 115. The vehicle computer 110 can actuate the battery 150 to provide power to various components 125 and/or sensors 115 based on the activation state.

The battery 150 has a state of charge that can vary between 0% (no remaining charge) and 100% (fully charged). The vehicle computer 110 can determine the state of charge of the battery 150 based on sensor 115 data. For example, the vehicle computer 110 can receive data from various sensors 115 indicating current flowing through the battery 150 and a temperature of the battery 150. The vehicle computer 110 can then determine the state of charge of the battery 150 based on the current and temperature, e.g., using an electrochemical battery model. A state of charge of the battery 150 typically specifies an amount of electrical energy stored in the battery 150. The state of charge is a level of charge of the battery 150 relative to a capacity of the battery 150. The capacity of a battery 150 is a maximum quantity of charge that the battery 150 can store. Capacity of the battery 150 may be specified in units of electrical charge, e.g., ampere-hours. The state of charge as a percentage is equal to the remaining units of charge divided by the capacity of the battery 150.

While in the minimal power state, the vehicle computer 110 can monitor an environment around the vehicle 105. For example, the vehicle 105 may include the plurality of external sensor assemblies 200, as set forth above. The external sensor assemblies 200 may be mounted to the body of the vehicle 105 and positioned to face the environment around the vehicle 105. That is, the first and second sensors 115a, 115b of the external sensor assemblies 200 may be arranged such that fields of view of the first and second sensors 115a, 115b encompass the environment around the vehicle 105.

In the minimal power state, the vehicle computer 110 can instruct a first sensor 115a of an external sensor assembly 200 to run at a scanning rate. The scanning rate may be determined empirically, e.g., based on determining a scanning rate that allows a first sensor 115a to detect an object moving through the field of view of the first sensor 115a while minimizing the power draw of the first sensor 115a. The vehicle computer 110 can detect objects around the vehicle 105 based on data from the first sensor 115a. For example, the vehicle computer 110 can monitor data from the first sensor 115a to detect an object has moved into the field of view of the first sensor 115a, e.g., based on determining that radio waves in some direction indicate a shorter distance than previous radio waves in that direction.

Upon detecting the object via data from the first sensor 115a, the vehicle computer 110 can activate the second sensor 115b of the external sensor assembly 200. The vehicle computer 110 can then identify the detected object based on data from the second sensor 115b. For example, the vehicle computer 110 can be programmed to classify and/or identify object(s) based on data from the second sensor 115b. For example, object classification techniques can be used, e.g., in the vehicle computer 110 based on lidar sensor 115 data, camera sensor 115 data, etc., to classify a detected object as mobile or stationary, i.e., non-movable. Additionally, or alternatively, object identification techniques can be used, e.g., in the vehicle computer 110 based on lidar sensor 115 data, camera sensor 115 data, etc., to identify a type of object, e.g., a vehicle, a user, etc., as well as physical features of objects. Non-limiting examples of objects include a user, another vehicle, an animal, etc.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., mobile or stationary) of one or more objects or an indication that no object is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object as a user, the vehicle computer 110 determines whether the user is authorized or unauthorized based on the data from the second sensor 115b. An authorized user has permission to access at least one zone 305 within the passenger cabin 300. An unauthorized user lacks permission to access any zone 305 within the passenger cabin 300. For example, the vehicle computer 110 can perform facial recognition to determine whether the user's face is an authorized face, i.e., a face of a known authorized person, e.g., stored in a memory. The vehicle computer 110 can use any suitable facial-recognition technique, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc.

Upon determining that the user is unauthorized, the vehicle computer 110 can prevent the user from accessing the vehicle 105, e.g., the passenger cabin 300. The vehicle 105 can include locks that are engageable to permit or prevent doors and/or windows from being opened. The vehicle computer 110 can, for example, actuate the locks to an engaged position, in which the doors and/or windows are locked, i.e., prevented from opening even if a handle and/or a switch is operated, based on the user being unauthorized.

Upon determining that the user is authorized, the vehicle computer 110 can permit the user to access the vehicle 105, e.g., the passenger cabin 300. For example, the vehicle computer 110 can actuate the locks to a disengaged position, in which the doors and/or windows are unlocked, i.e., permitted to open if the handle and/or the switch is operated. Specifically, the vehicle computer 110 can actuate locks to unlock a door and/or window that allows the user to access an authorized zone 305 within the passenger cabin 300.

The vehicle computer 110 can determine which door and/or window to unlock based on a user authorization associated with the user. A user authorization specifies one or more vehicle features that the user has permission to access. In this context a "vehicle feature" is a setting of a vehicle component 125 that can be selected by user (e.g., occupant) input. Non-limiting examples of vehicle features include heated seats, cooled seats, multi-zone climate control, heated steering wheel, auto-dimming rearview mirror, heated sides mirrors, multi-color lighting, a radio, a moonroof, etc.

The user authorization may be stored, e.g., in a memory of the vehicle computer 110. The user authorization may be determined based on user input. For example, an owner of the vehicle 105 may provide various user inputs, e.g., via the HMI 118 or the user device 145, specifying authorized users and a corresponding user authorization for each authorized user. An example user authorization is shown in Table 1 below.

TABLE 1

| Vehicle Feature | Permission |
| --- | --- |
| Access front seats? | Yes |
| Charge battery 150? | Yes |
| Actuate climate control system? | No |
| Adjust seat position? | No |

Upon determining that the user is authorized, the vehicle computer 110 can access the user authorization for the user. The vehicle computer 110 can, for example, unlock front doors, i.e., doors adjacent to the front seats, based on the user authorization specifying that the user has permission to access the front seats. In this situation, the vehicle computer 110 may determine that a zone 305 encompassing the front seats is an authorized zone 305 for the authorized user. As another example, the vehicle computer 110 can unlock rear doors, i.e., doors adjacent to back seats, based on the user authorization specifying that the user lacks permission to access the front seats. In this situation, the vehicle computer 110 may keep the front doors locked. Additionally, the vehicle computer 110 may determine that a zone 305 encompassing the back seats (or third-row seats) is an authorized zone 305 for the authorized user.

The vehicle computer 110 is programmed to monitor the authorized user within the passenger cabin 300, e.g., to determine whether the authorized user remains in an authorized zone 305. For example, the vehicle 105 may include the plurality of internal sensor assemblies 200, as set forth above. The plurality of internal sensor assemblies 200 may be arranged to monitor the plurality of zones 305. Specifically, each internal sensor assembly 200 may be positioned to obtain data of one respective zone 305. That is, the first and second sensors 115a, 115b of a respective internal sensor assembly 200 may be arranged such that fields of view of the first and second sensors 115a, 115b encompass a respective zone 305 within the passenger cabin 300.

The vehicle computer 110 can instruct a first sensor 115a of an internal sensor assembly 200 to run at the scanning rate. The vehicle computer 110 can detect authorized users within a respective zone 305 based on data from the first sensor 115a, e.g., in substantially the same manner as discussed above in regards to detecting objects in the environment around the vehicle 105. Since each internal sensor assembly 200 is positioned to face one respective zone 305, the vehicle computer 110 can determine the authorized user is outside of the authorized zone 305 and within the passenger cabin 300 based on detecting the authorized user via data from a first sensor 115a of an internal sensor assembly 200 that faces, i.e., has a field of view encompassing, an unauthorized zone 305 for the authorized user. Similarly, the vehicle computer 110 can determine the authorized user is in the authorized zone 305 based on detecting the authorized user via data from a first sensor 115a of an internal sensor assembly 200 that faces the authorized zone 305 for the authorized user.

Upon determining that the authorized user is outside of the authorized zone 305 and within the passenger cabin 300, the vehicle computer 110 can activate the second sensor 115b of the internal sensor assembly 200 facing the unauthorized zone 305 in which the authorized user has been detected. The vehicle computer 110 can then obtain data from the second sensor 115b and provide the data to the remote server computer 140 and/or the user device 145, e.g., via the network 135. Additionally, or alternatively, the vehicle computer 110 may be programmed to actuate an alarm in the vehicle 105. For example, the vehicle computer 110 can actuate one or more vehicle components 125, e.g., speakers, a display, a horn, exterior lights, etc., to output an audio and/or visual alert indicating an authorized user is in an unauthorized zone 305.

Upon determining that the authorized user is in the authorized zone 305, the vehicle computer 110 can identify permitted vehicle features for the authorized user based on the user authorization. For example, the vehicle computer 110 can access the user authorization for the authorized user and identify, from the user authorization, the vehicle features that the user has permission to operate.

The vehicle computer 110 can be programmed to activate a permitted vehicle feature based on a user input. For example, the vehicle computer 110 may actuate the HMI 118 to detect a user input selecting a vehicle feature. For example, the HMI 118 may be programmed to display a virtual button on a touchscreen display that the user can select to select the vehicle feature. In this situation, the HMI 118 may activate sensors 115 that can detect the user selecting the virtual button to select the vehicle feature. As another example, the HMI 118 may detect that the user pressed a physical button or switch on a vehicle component 125 associated with the vehicle feature. Upon detecting the user input, the HMI 118 can provide the user input to the vehicle computer 110, and the vehicle computer 110 determines the selected vehicle feature based on the user input.

Since each user authorization corresponds to one authorized user, a selected vehicle feature may be permitted for one authorized user and unpermitted for another authorized user. In an example in which a second authorized user is within the authorized zone 305, the vehicle computer 110 can determine whether the authorized user or the second authorized user provided the user input based on data from the first sensor 115a having the field of view encompassing the authorized zone 305. For example, the vehicle computer 110 can detect the authorized user or the second authorized user moving, e.g., extends an arm, towards the HMI 118, e.g., based on determining that radio waves in some direction indicate a shorter distance than previous radio waves in that direction. Upon detecting one of the authorized user or the second authorized user moving towards the HMI 118, the vehicle computer 110 can determine that the one of the authorized user or the second authorized user provided the user input.

The vehicle computer 110 can then determine whether the selected vehicle feature is a permitted vehicle feature, i.e., one that the authorized user has permission to operate, or an unpermitted vehicle feature, i.e., one that the authorized user lacks permission to operate. The vehicle computer 110 can compare the selected vehicle feature to the permitted vehicle features specified by the user authorization for the authorized user that provided the user input. If the selected vehicle feature matches a permitted vehicle feature, then the vehicle computer 110 determines that the selected vehicle feature is permitted. If the selected vehicle feature does not match a permitted vehicle feature, then the vehicle computer 110 determines that the selected vehicle feature is unpermitted. Upon determining that the selected vehicle feature is unpermitted, the vehicle computer 110 prevents actuation of the selected unpermitted vehicle feature.

Upon determining that the selected vehicle feature is permitted, the vehicle computer 110 then compares the state of charge of the battery 150 to a charge threshold. The vehicle computer 110 can determine the state of charge of the battery 150 based on sensor 115 data, as discussed above. The charge threshold is determined empirically, e.g., based on testing that allows for determining a minimum state of charge of the battery 150 that allows the battery 150 to activate the vehicle 105 in the on state, e.g., to initiate propulsion of the vehicle 105. If the state of charge of the battery 150 is greater than the charge threshold, then the vehicle computer 110 can activate, i.e., turn on, an operational setting for the selected permitted vehicle feature. If the state of charge of the battery 150 is less than or equal to the charge threshold, then the vehicle computer 110 prevents actuation of the selected permitted vehicle feature.

While the selected permitted vehicle feature is operating, the vehicle computer 110 monitors the state of change of the battery 150. If the state of charge remains greater than the charge threshold, then the vehicle computer 110 maintains operation of the selected permitted vehicle feature, e.g., until receiving a user input via the HMI 118 deselecting the permitted vehicle feature. If the state of charge decreases below the charge threshold, then the vehicle computer 110 stops actuation of the selected permitted vehicle feature. That is, the vehicle computer 110 deactivates, i.e., turns off, the operational setting of the selected permitted vehicle feature.

Upon stopping actuation of the selected permitted vehicle feature, the vehicle computer 110 determines whether to actuate an engine 155, e.g., an internal combustion engine, based on the user authorization. The user authorization specifies whether the authorized user has permission to charge the battery 150. If the user has permission to charge the battery 150, then the vehicle computer 110 can actuate, i.e., turn on, the engine 155 to charge the battery 150, e.g., based on receiving a user input from the HMI 118 selecting to charge the battery 150, e.g., the authorized user pressing a power button in the passenger cabin 300. In this situation, the vehicle computer 110 can continue to monitor the state of charge of the battery 150. Upon determining that the state of charge increases above the charge threshold, the vehicle computer 110 may re-activate the selected permitted vehicle feature. The vehicle computer 110 may stop, i.e., turn off, the engine 155 after a predetermined time, e.g., specified by a user input from the owner of the vehicle 105, or when the state of charge of the battery 150 is, e.g., equal to the charge threshold or greater than the charge threshold by a specified amount, or fully charged. If the user lacks permission to charge the battery 150, then the vehicle computer 110 prevents actuation of the engine 155 to charge the battery 150.

Figure 4:
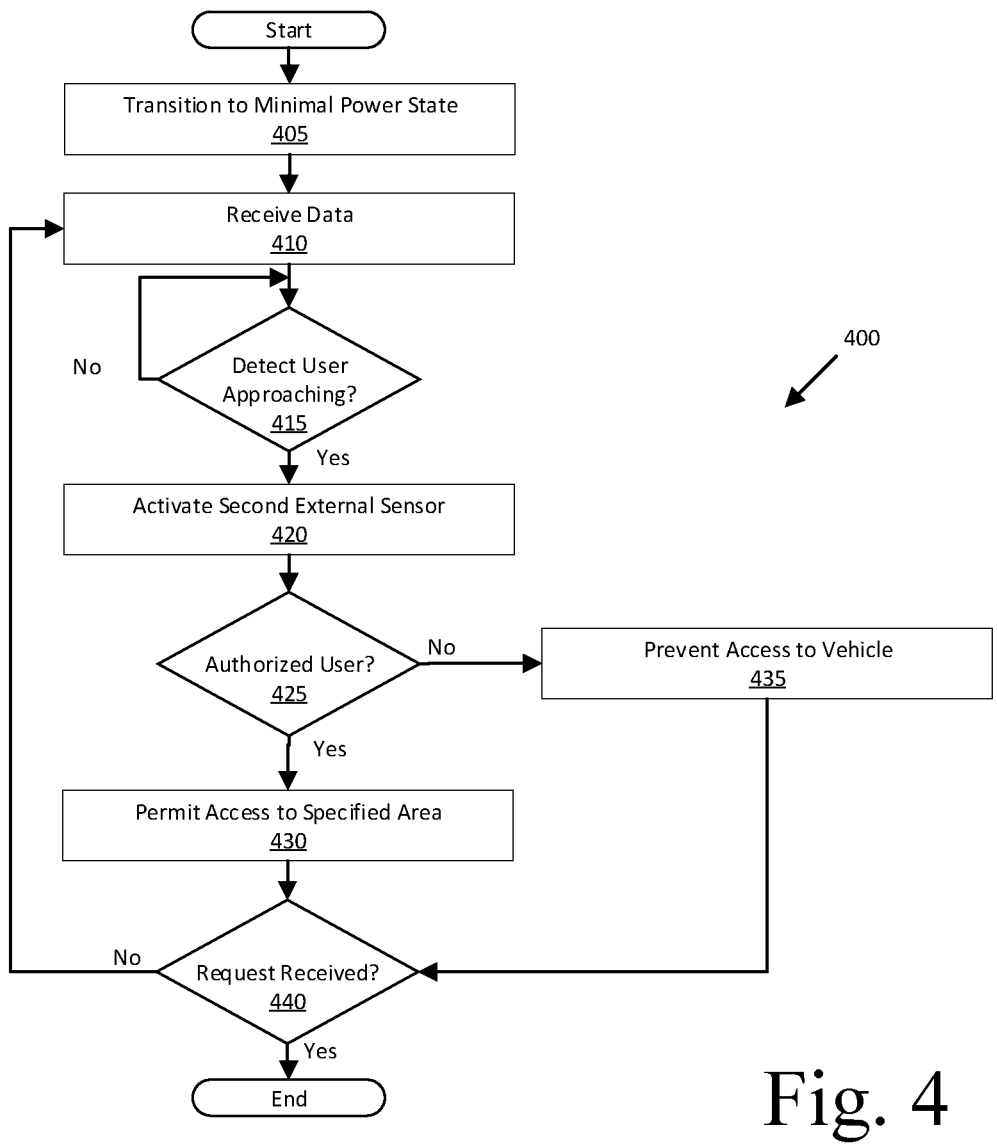
FIG. 4 is a flowchart of an example process for permitting access to a vehicle in a minimal power state.

FIG. 4 is a flowchart of an example process 400 for permitting access to a vehicle 105 in a minimal power state. The process 400 begins in a block 405. The process 400 can be carried out by a vehicle computer 110 included in the vehicle 105 executing program instructions stored in a memory thereof.

In the block 405, the vehicle computer 110 transitions the vehicle 105 to the minimal power state, e.g., based on receiving a request from, e.g., a remote server computer 140, user input to a power button in a passenger cabin 300 of the vehicle 105, etc. Upon transition the vehicle 105 to the minimal power state, the vehicle computer 110 can activate a first sensor 115a of an external sensor assembly 200, as discussed above. The process 400 continues in a block 410.

In the block 410, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive data from a first sensor 115a. The data from the first sensor 115a may include data about the environment around the vehicle 105, e.g., objects, users, etc. The process 400 continues in a block 415.

In the block 415, the vehicle computer 110 determines whether a user is approaching the vehicle 105. The vehicle computer 110 can detect a user approaching the vehicle 105 via data from the first sensor 115a, as discussed above. If the vehicle computer 110 detects a user approaching the vehicle 105 from the first sensor 115a data, then the process 400 continues in a block 420. Otherwise, the process 400 remains in the block 415.

In the block 420, the vehicle computer 110 actuates a second sensor 115b of the external sensor assembly 200. The vehicle computer 110 can then receive data from the second sensor 115b. The data from the second sensor 115a may include data about the environment around the vehicle 105, e.g., the detected user. The process 500 continues in block 425.

In the block 425, the vehicle computer 110 determines whether the user detected in the block 415 is authorized. The vehicle computer 110 can identify the detected user based on data from the second sensor 115b, as discussed above. If the vehicle computer 110 determines that the detected user is authorized, then the process 400 continues in a block 430. Otherwise, the process 400 continues in a block 435.

In the block 430, the vehicle computer 110 permits the authorized user to access the vehicle 105. For example, the vehicle computer 110 can actuate locks to a disengaged position, in which doors and/or windows of the passenger cabin 300 are unlocked, as discussed above. Specifically, the vehicle computer 110 can actuate locks to unlock a door and/or window that allows the user to access an authorized zone 305 within the passenger cabin 300. The vehicle computer 110 can determine the authorized zone 305 for the authorized user based on a user authorization associated with the authorized user, as discussed above. The process 400 continues in a block 440.

In the block 435, the vehicle computer 110 prevents the unauthorized user from accessing the vehicle 105. For example, the vehicle computer 110 can actuate locks to an engaged position, in which doors and/or windows of the passenger cabin 300 are locked, as discussed above. The process 400 continues in a block 440.

In the block 440, the vehicle computer 110 determines whether a request to transition the vehicle 105 to another activation state, i.e., the on state or the off state, has been received. For example, the vehicle computer 110 can receive a request to transition the vehicle 105 to an off state or an on state from, e.g., a remote server computer 140, user input to a power button in a passenger cabin 300 of the vehicle 105, etc. If the vehicle computer 110 does not receive the request, then the process 400 returns to the block 410. If the vehicle computer 110 receives the request, then the vehicle computer 110 transitions the vehicle 105 to the activation state specified by the request, and the process 400 ends following the block 440.

Figure 5A:
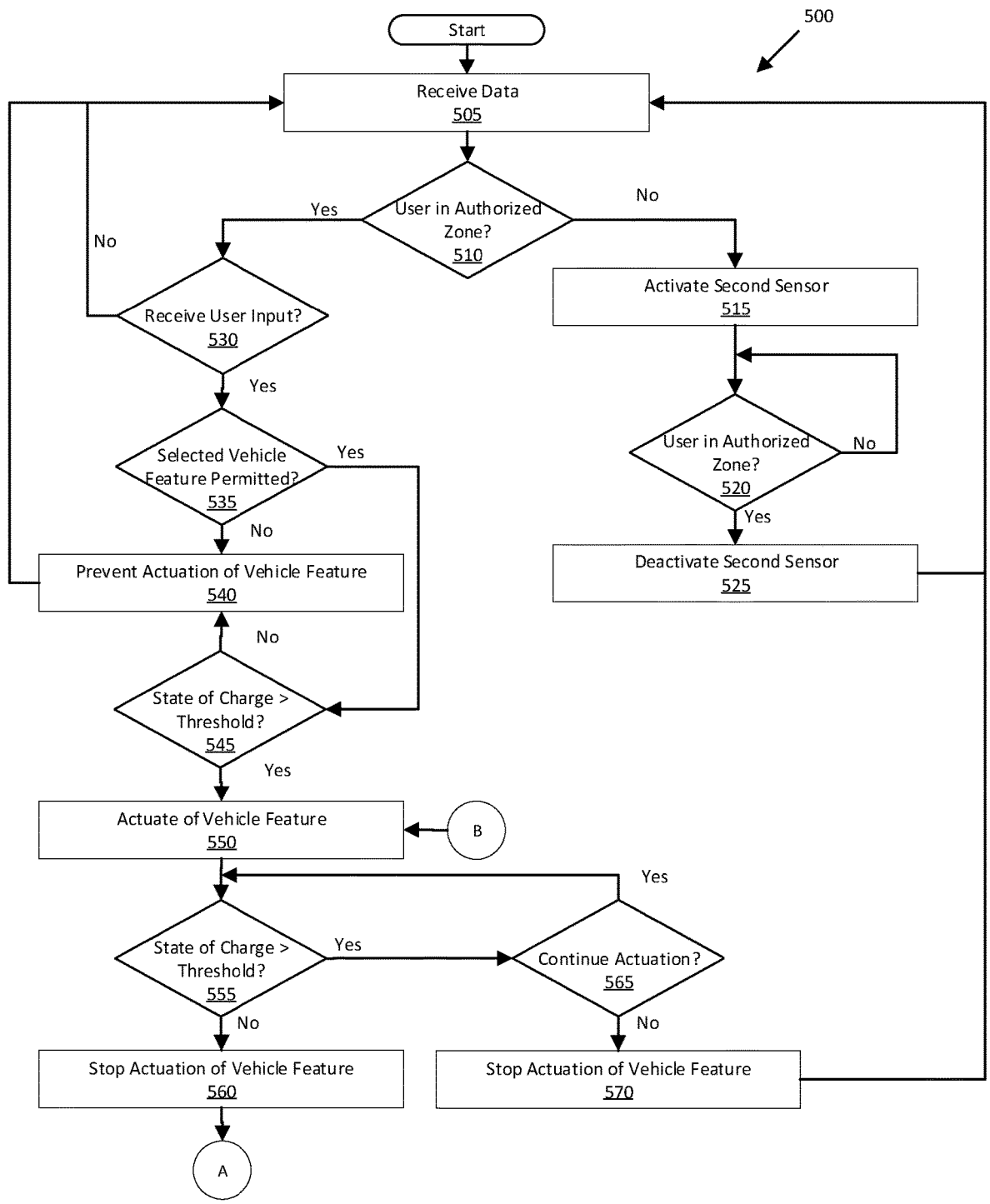
FIG. 5A is a first part of a flowchart of an example process for operating the vehicle in the minimal power state.

FIG. 5A is a first portion of a flowchart of an example process 500 (the second portion being shown in FIG. 5B because the entire flowchart will not fit on a single drawing sheet) for operating the vehicle 105 in a minimal power state. The process 500 begins in a block 505. The process 500 can be carried out by the vehicle computer 110 included in the vehicle 105 executing program instructions stored in a memory thereof.

In the block 505, the vehicle computer 110 receives data from one or more first sensors 115a of respective internal sensor assemblies 200. The data from the first sensors 115a may include data about a respective zone 305 within a passenger cabin 300 of the vehicle 105, e.g., authorized users. That is, the first sensors 115a may be arranged such that a respective field of view of each first sensor 115a encompasses one respective zone 305 within the passenger cabin 300, as discussed above. The process 500 continues in a block 510.

In the block 510, the vehicle computer 110 determines whether an authorized user is in an authorized zone 305 within the passenger cabin 300. The vehicle computer 110 can detect the authorized user based on data from the first sensor 115a, as discussed above. Specifically, since each first sensor 115a has a field of view that encompasses one respective zone 305, the vehicle computer 110 can determine the authorized user is in the authorized zone 305 based on detecting the authorized user via data from a first sensor 115a having a field of view encompassing the authorized zone 305, as discussed above. If the vehicle computer 110 detects the authorized user within the authorized zone 305, the process 500 continues in a block 530. Otherwise, the process 500 continues in a block 515.

In the block 515, the vehicle computer 110 activates a second sensor 115b having a field of view that encompasses an unauthorized zone 330 in which the authorized user has been detected, e.g., via data from a first sensor 115a having a field of view that encompasses the unauthorized zone 305. The vehicle computer 110 can provide data from the second sensor 115b to a remote server computer 140 and/or a user device 145, e.g., via a network 135. Additionally, or alternatively, the vehicle computer 110 may actuate an alarm in the vehicle 105, as discussed above. The process 500 continues in a block 520.

In the block 520, the vehicle computer 110 determines whether the authorized user has returned to the authorized zone 305. The block 520 is substantially the same as the block 510 of process 500 and therefore will not be described further to avoid redundancy. If the vehicle computer 110 detects the authorized user within the authorized zone 305, the process 500 continues in a block 525. Otherwise, the process 500 remains in the block 520.

In the block 525, the vehicle computer 110 deactivates the second sensor 115b activated in the block 515. Additionally, the vehicle computer 110 can stop actuating the alarm. The process 500 returns to the block 505.

In the block 530, the vehicle computer 110 determines whether a user input selecting a vehicle feature has been received via an HMI 118. For example, the HMI 118 can detect a user pressing a button, e.g., a virtual button on a touchscreen display or a physical button on a vehicle component 125, as discussed above. Upon detecting the user input selecting the vehicle feature, the HMI 118 provides the user input to the vehicle computer 110, and the vehicle computer 110 determines the selected vehicle feature based on the user input.

Additionally, in an example in which multiple authorized users are within the authorized zone, the vehicle computer 110 can determine which authorized user provided the user input based on data from the first sensor 115a having respective field of view encompassing the authorized zone 305, as discussed above. If the vehicle computer 110 receives a user input from the HMI 118, then the process 500 continues in a block 535. Otherwise, the process 500 returns to the block 505.

In the block 535, the vehicle computer 110 determines whether the selected vehicle feature is permitted for the authorized user based on a user authorization associated with the authorized user. The vehicle computer 110 can access the user authorization associated with the authorized user that provided the user input. The vehicle computer 110 can then compare the selected vehicle feature to the permitted vehicle features specified by the user authorization for the authorized user that provided the user input. If the selected vehicle feature matches a permitted vehicle feature, the process 500 continues in a block 545. Otherwise, the process 500 continues in a block 540.

In the block 540, the vehicle computer 110 prevents actuation of the selected vehicle feature. That is, the vehicle computer 110 does not activate, i.e., turn on, an operational setting of the vehicle feature. The process 500 returns to the block 505.

In the block 545, the vehicle computer 110 determines whether a state of charge of a battery 150 is greater than a charge threshold. The vehicle computer 110 can determine the state of charge of the battery 150 based on sensor 115 data, as discussed above. The vehicle computer 110 can then compare the state of charge to the charge threshold. If the state of charge of the battery 150 is greater than the charge threshold, then the process 500 continues in a block 550. Otherwise, the process 500 returns to the block 540.

In the block 550, the vehicle computer 110 actuates the selected vehicle feature. That is, the vehicle computer 110 activates, i.e., turns on, the operational setting of the selected vehicle feature. The process 500 continues in a block 555.

In the block 555, the vehicle computer 110 determines whether a state of charge of a battery 150 is greater than a charge threshold. The block 555 is substantially the same as the block 545 of process 500 and therefore will not be described further to avoid redundancy. If the state of charge of the battery 150 is greater than the charge threshold, then the process 500 continues in a block 565. Otherwise, the process 500 returns to the block 560.

In the block 560, the vehicle computer 110 stops actuation of the selected vehicle feature. The process 500 continues in a block 575.

In the block 565, the vehicle computer 110 determines whether to continue actuation of the selected vehicle feature. For example, the vehicle computer 110 can stop actuation of the selected vehicle feature based on receiving, e.g., via the HMI 118, a user input deselecting the vehicle feature. If the vehicle computer 110 fails to receive the user input deselecting the vehicle feature, then the vehicle computer 110 determines to continue actuation of the selected vehicle feature. If the vehicle computer 110 determines to continue actuation of the selected vehicle feature, then the process 500 returns to the block 555. Otherwise, the process 500 continues in a block 570.

In the block 570, the vehicle computer 110 stops actuation of the selected vehicle feature. The process 500 returns to the block 505.

Figure 5B:
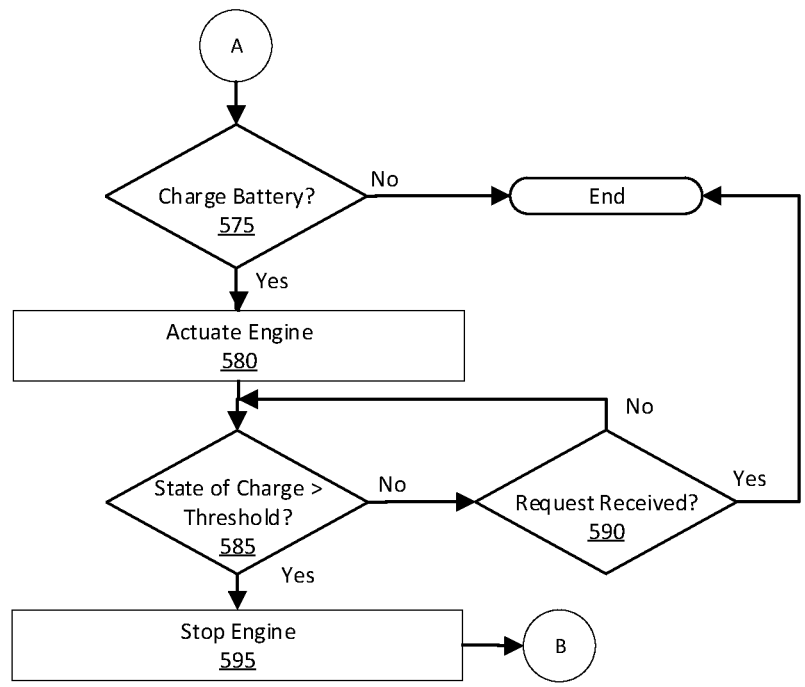
FIG. 5B is a second part of the flowchart of FIG. 5A.

Turning now to FIG. 5B, following the block 560 shown in FIG. 5A, in the block 575, the vehicle computer 110 determines whether to charge the battery 150 based on the user authorization. The user authorization specifies whether the authorized user has or lacks permission to charge the battery 150. If the user has permission to charge the battery 150, then the process 500 continues in a block 580. If the user lacks permission to charge the battery 150, then the process 500 ends following the block 575.

In the block 580, the vehicle computer 110 actuates, i.e., turns on, an engine 155 to charge the battery 150. In this situation, the vehicle computer 110 transitions the vehicle 105 to the on state. The process 500 continues in a block 585.

In the block 585, the vehicle computer 110 determines whether a state of charge of a battery 150 is greater than a charge threshold. The block 585 is substantially the same as the block 545 of process 500 and therefore will not be described further to avoid redundancy. If the state of charge of the battery 150 is greater than the charge threshold, then the process 500 continues in a block 595. Otherwise, the process 500 continues in a block 590.

In the block 590, the vehicle computer 110 determines whether a request to transition the vehicle 105 to the off state, has been received. The block 590 is substantially the same as the block 440 of process 400 and therefore will not be described further to avoid redundancy. If the vehicle computer 110 does not receive the request, then the process 500 returns to the block 585. If the vehicle computer 110 receives the request, then the vehicle computer 110 transitions the vehicle 105 to the off state, and the process 500 ends following the block 590.

In the block 595, the vehicle computer 110 stops actuation of, i.e., turns off, the engine 155. For example, the vehicle computer 110 may stop actuation of the engine 155 when the state of charge of the battery 150 is, e.g., above the charge threshold by a specified amount or fully charged. In this situation, the vehicle computer 110 transitions the vehicle 105 to the minimal power state. The process 500 returns to the block 550.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a first sensor;
    a second sensor having a higher power draw than the first sensor; and
    a computer communicatively coupled to the first sensor and the second sensor;
    wherein the computer includes a processor and a memory, the memory storing instructions executable by the processor to:
    upon identifying an authorized user approaching a vehicle, control vehicle locks to permit the authorized user to access an authorized area based on a user authorization;
    identify permitted vehicle features within the authorized area for the authorized user based on the user authorization;
    upon receiving a user input selecting one permitted vehicle feature, actuate the selected permitted vehicle feature based on determining that a state of charge of a battery is above a charge threshold;
    upon determining that the state of charge of the battery decreases below the charge threshold, stop actuation of the selected permitted vehicle feature; and
    then control an engine to charge the battery based on the user authorization specifying user permission to charge the battery.

2. The system of claim 1, further comprising a housing containing the first sensor and the second sensor.

3. The system of claim 2, wherein the first sensor and the second sensor are arranged in the housing so that respective fields of view of the first sensor and second sensor encompass the authorized area.

4. The system of claim 1, wherein the first sensor is a radar, and the second sensor is a camera.

5. The system of claim 1, wherein the first sensor and the second sensor are within a passenger cabin of the vehicle.

6. A system, comprising a computer including a processor and a memory, the memory storing instructions executable by the processor to:
    upon identifying an authorized user approaching a vehicle, control vehicle locks to permit the authorized user to access an authorized area based on a user authorization;
    identify permitted vehicle features within the authorized area for the authorized user based on the user authorization;
    upon receiving a user input selecting one permitted vehicle feature, actuate the selected permitted vehicle feature based on determining that a state of charge of a battery is above a charge threshold;
    upon determining that the state of charge of the battery decreases below the charge threshold, stop actuation of the selected permitted vehicle feature; and
    then control an engine to charge the battery based on the user authorization specifying user permission to charge the battery.

7. The system of claim 6, wherein the instructions further include instructions to, upon identifying an unauthorized user, control vehicle locks to prevent the unauthorized user from accessing the vehicle.

8. The system of claim 6, wherein the instructions further include instructions to, upon detecting the authorized user in an area outside of the authorized area and within the vehicle, provide a message to a remote computer.

9. The system of claim 6, wherein the instructions further include instructions to, upon receiving a user input selecting an unpermitted vehicle feature, prevent actuation of the selected unpermitted vehicle feature.

10. The system of claim 6, wherein the instructions further include instructions to determine the authorized user is in the authorized area based on data from a first sensor.

11. The system of claim 10, wherein the instructions further include instructions to, upon detecting the authorized user in an area outside of the authorized area and within the vehicle, activate a second sensor, wherein the second sensor has a higher power draw than the first sensor.

12. The system of claim 11, wherein the instructions further include instructions to provide data from the second sensor to a remote computer.

13. The system of claim 10, wherein the instructions further include instructions to, upon detecting a second authorized user within the authorized area, determine whether the authorized user or the second authorized user provides the user input based on data from the first sensor.

14. The system of claim 6, wherein the instructions further include instructions to actuate the engine to charge the battery based on the authorized user having permission to charge the battery.

15. The system of claim 14, wherein the instructions further include instructions to stop the engine based on detecting the state of charge increases above the charge threshold.

16. The system of claim 14, wherein the instructions further include instructions to, upon detecting the state of charge increases above the charge threshold, actuate the selected permitted vehicle feature.

17. The system of claim 6, wherein the instructions further include instructions to prevent actuation of the engine to charge the battery based on the authorized user lacking permission to charge the battery.

18. The system of claim 6, wherein the instructions further include instructions to detect a user approaching the vehicle based on data from a first external sensor.

19. The system of claim 18, wherein the instructions further include instructions to, upon detecting the user approaching the vehicle, activate a second external sensor, wherein the second external sensor has a higher power draw than the first external sensor.

20. The system of claim 19, wherein the instructions further include instructions to identify the user based on data from the second external sensor.

\* \* \* \* \*